United States Patent
Anslot et al.

(10) Patent No.: US 9,980,124 B2
(45) Date of Patent: May 22, 2018

(54) SYSTEM AND METHOD FOR HANDLING UNUSED SIM CARDS

(71) Applicant: BUZZINBEES, Seyssinet Pariset (FR)

(72) Inventors: Michel Anslot, Mougins (FR); Philippe Bouckaert, Biot (FR); Jean-Rene Bouvier, Biviers (FR)

(73) Assignee: BUZZINBEES, Seyssinet Pariset (FR)

( * ) Notice: Subject to any disclaimer, the term of this patent is extended or adjusted under 35 U.S.C. 154(b) by 0 days. days.

(21) Appl. No.: 15/120,308

(22) PCT Filed: Feb. 23, 2015

(86) PCT No.: PCT/EP2015/053761
§ 371 (c)(1),
(2) Date: Aug. 19, 2016

(87) PCT Pub. No.: WO2015/124781
PCT Pub. Date: Aug. 27, 2015

(65) Prior Publication Data
US 2017/0180975 A1    Jun. 22, 2017

(30) Foreign Application Priority Data
Feb. 21, 2014    (EP) .................................... 14305245

(51) Int. Cl.
*H04W 4/00*    (2018.01)
*H04W 8/04*    (2009.01)
*H04W 40/34*   (2009.01)
*H04W 8/18*    (2009.01)

(52) U.S. Cl.
CPC ............. *H04W 8/04* (2013.01); *H04W 4/001* (2013.01); *H04W 8/183* (2013.01); *H04W 40/34* (2013.01)

(58) Field of Classification Search
CPC ....... H04W 92/02; H04W 88/06; H04W 8/26; H04W 88/02; H04B 1/3816; H04M 2250/14

See application file for complete search history.

(56) References Cited

U.S. PATENT DOCUMENTS

| | | | |
|---|---|---|---|
| 2006/0058028 A1* | 3/2006 | Allison | H04M 15/90 |
| | | | 455/435.1 |
| 2010/0210306 A1 | 8/2010 | Larsson | |
| 2013/0252584 A1 | 9/2013 | Cuadrat et al. | |

FOREIGN PATENT DOCUMENTS

| EP | 2280566 | * | 2/2011 | ............. H04W 8/26 |
|---|---|---|---|---|
| WO | WO 2004/028191 | * | 4/2004 | ............. H04Q 7/38 |
| WO | 2012015366 A1 | | 2/2012 | |

OTHER PUBLICATIONS

International Search Report for corresponding International PCT application No. PCT/EP2015/053761, dated Aug. 18, 2015.

* cited by examiner

*Primary Examiner* — Steve D'Agosta
(74) *Attorney, Agent, or Firm* — Hauptman Ham, LLP

(57) ABSTRACT

A method in a cellular communication network comprising the following steps: marking a SIM card as dormant when said SIM card has not been used for at least an observation duration, provisioning a release node by backing up managing parameters related to said dormant SIM card, in a database, de-provisioning relevant managing nodes by removing managing parameters related to said dormant SIM card, redirecting any attachment request emanating from said dormant SIM card to the release node.

22 Claims, 3 Drawing Sheets

SYSTEM AND METHOD FOR HANDLING UNUSED SIM CARDS

Figure 1:
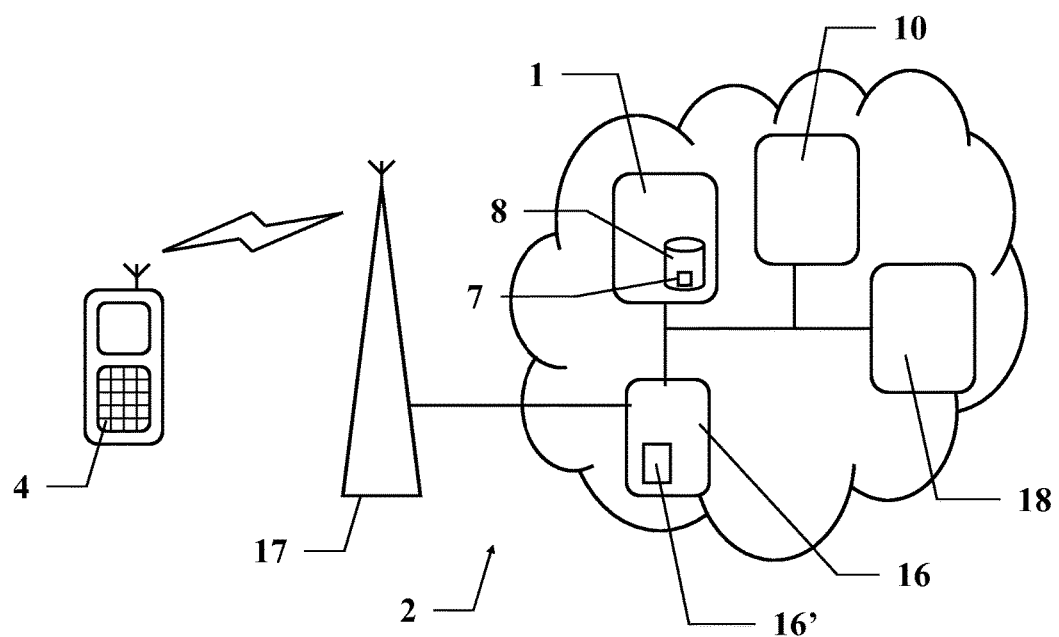

The technical domain of the invention is the domain of cellular communication network management. More precisely it concerns the release of resources related to unused SIM card.

In a cellular communication network a SIM card is associated to a subscription and allows a subscriber to use a terminal so as to connect to the cellular communication network and to use its communication services, such as phone calls, text messaging, etc.

After a SIM card has been initialized, during a first attachment to the cellular communication network, said SIM card is known to the cellular communication network and is marked as active. Consequently some managing nodes in the cellular communication network, further named "relevant managing nodes", are provisioned so as to dedicate some of their memory resources to store "managing parameters" associated to said SIM card. Said managing parameters are specific to said SIM card and are necessary to manage an attachment of said SIM card to the cellular communication network and the delivery of communication services. Among those managing parameters are: the International Mobile Subscriber Identifier (IMSI), the encryption key (Ki) and the Mobile Station Integrated Services Digital Network Number (MSISDN). The Home Location Register (HLR) for GSM or EDGE networks or the Home Subscriber Server (HSS) for LTE or UMTS networks is an example of relevant managing nodes. In the following description the term HLR/HSS will be used to encompass either a HLR or a HSS in function of the network wherein the invention is implemented.

The document US2010/210306 provides a solution to re-activate a SIM card that has been de-activated while the cellular phone was attached to the network. To achieve that aim, this solution of US2010/210306 relies on a temporary IMSI ("IMSI-T") that is sent to the SIM card before during the de-activation phase and that replaces the previous IMSI of the SIM card. After re-activation a new MSISDN is associated to the cellular phone.

Each SIM card provisioned in a network occupies storage resources and costs money to the cellular communication network operator. Indeed, usually a cellular communication network operator is charged a rent that is function of the number of such active SIM cards provisioned. Consequently, active SIM cards that are not used represent a dead weight for an operator. Such inactive SIM cards usually induce no profit for the operator while they cost as long as they are provisioned in said managing nodes. Therefore, de-provisioning the managing parameters associated to inactive SIM cards from the managing nodes allows operators to save a lot of money.

National regulations generally allow cellular communication network operators to inactivate a subscription and to de-provision relevant managing nodes by removing all records relating to a SIM card associated to said subscription and to reallocate the phone number, also referred to by the acronym MSISDN, after a given minimum quarantine duration has elapsed without said SIM card being used. During at least said quarantine duration the operator must keep record of said SIM card. Said quarantine duration most often counts in months, e.g. six months. The quarantine duration most often lasts between 30 days and 352 days. This means that, depending of the operators and national regulations, the SIM card can be considered as inactive after only 30 days of absence of activity in some countries, while in some other countries, the operator must wait 352 after the last activity of the cellular terminal before considering the SIM card as inactive. More often the quarantine duration lasts between 30 days and 180 days.

Although the resources of the network can be released after the end of the quarantine duration, it would still be very advantageous to release resources, and thus decrease the corresponding rent charges, before that period.

To achieve this aim, according to an embodiment, the invention describes a method in a cellular communication network (2) comprising at least a home location register/home subscriber server (HLR/HSS) (10) that stores managing parameters (7) related to a SIM card (4) associated to a cellular terminal configured to be connected to the network (2) said managing parameters (7) comprising at least an International Mobile Subscriber Identifier (IMSI), and at least a routing node (16) configured to route requests between the cellular terminal and the HLR/HSS (10), provisioning (22) a release node (1) which comprises
backing up (22) in at least a database (8) of said release node (1) said managing parameters (7);

characterized in that the method performs the following steps if said SIM card (4) has not been used before the end of an observation duration (50) starting from the last activity of the SIM card:

de-provisioning (23) at least the HLR/HSS (10) by removing from the HLR/HSS (10) an identifier of a subscription (MSISDN) associated to the SIM card (4);

directing toward the release node (1) any attachment request emanating from said SIM card (4);

if, once the de-provisioning (23) of at least the HLR/HSS (10) is completed, an activity of the SIM card is detected before the end of a quarantine duration (60) that starts at the same time as the observation period (50) and that is longer than the observation period (50), then the method comprises reactivating the SIM card (4) through performing the following steps:

re-provisioning (26) at least the HLR/HSS (10) by providing back the HLR/HSS (10) with at least said identifier of a subscription (MSISDN) associated to the SIM card (4) and stored in the database (8);

directing toward the HLR/HSS (10) any message emanating from said SIM card (4);

if, once the de-provisioning (23) of at least the HLR/HSS (10) is completed, no activity of the SIM card (4) is detected before the end of a quarantine duration (60) that starts at the same time as the observation period (50) and that is longer than the observation period (50), then the method comprises de-activating the SIM card (4) through performing the following steps:

recycling the identifier of a subscription (MSISDN) of said SIM card in a phone number pool.

Optionally, the invention may comprise any one of the following features and steps that can be taken separately or in combination:

According to an embodiment, the step of directing toward the release node (1) any attachment request emanating from said SIM card (4) comprises modifying at least a routing table (16') of the routing node (16) so that the routing node (16) redirects any attachment request emanating from said SIM card (4) to the release node (1).

According to an embodiment, directing toward the HLR/HSS (10) any message emanating from said SIM card (4) comprises modifying at least the routing table (16') of the routing node (16) so that the routing node (16) redirects any message emanating from said SIM card (4) to the HLR/HSS (10);

According to an embodiment, if, once the de-provisioning (23) of at least the HLR/HSS (10) is completed, no activity of the SIM card (4) is detected before the end of a quarantine duration (60) that starts at the same time as the observation period (50) and that is longer than the observation period (50), then the method comprises de-activating the SIM card (4) through performing the following steps: then removing from the database (8) of the release node (1) the managing parameters of the SIM card.

According to an embodiment, after said SIM card (4) has not been used for at least a quarantine duration (5) the recycler node (1) is provisioned with the new identifier of a subscription (New MSISDN).

According to an embodiment, the step of sending any attachment request emanating from said SIM card (4) to the recycler node (1) comprises: the routing node (16) redirects any attachment request emanating from said SIM card (4) to the recycler node (1) and to the HLR/HSS (10).

According to an embodiment, the routing node (16) duplicates any attachment request emanating from said SIM card (4) and send it to both the recycler node (1) and the HLR/HSS (10).

According to an embodiment, sending any attachment request emanating from said SIM card (4) to the recycler node (1), comprises associating, in the routing tables (16') of the routing node (16), the IMSI of said inactive SIM card (4) with an address of said recycler node (1) and with an address of the HLR/HSS (10).

According to an embodiment, the step of de-provisioning (23) at least the HLR/HSS (10) comprises keeping in the HLR/HSS (10) said IMSI related to said SIM card (4).

According to another embodiment, the invention describes method in a cellular communication network comprising at least a home location register/home subscriber server (HLR/HSS) that stores managing parameters related to a SIM card associated to a cellular terminal configured to be connected to the network, and at least a routing node configured to route requests between the cellular terminal and the HLR/HSS, wherein the method performs the following steps if said SIM card has not been used before the end of an observation duration starting from the last activity of the SIM card i.e., the SIM card is considered as dormant (DORMANT state):

de-provisioning at least the HLR/HSS by removing from the HLR/HSS managing parameters comprising at least a unique identifier of the SIM card (IMSI) and an identifier of a subscription (MSISDN) associated to the SIM card;

provisioning a release node which comprises backing up in at least a database of said release node said managing parameters;

modifying at least a routing table of the routing node so that the routing node redirects any attachment request emanating from said SIM card to the release node and not any more to the HLR/HSS;

if, once the de-provisioning of at least the HLR/HSS is completed, an activity of the SIM card is detected before the end of a quarantine duration that starts at the same time as the observation period and that is longer than the observation period, then the method comprises reactivating the SIM card through performing the following steps:

re-provisioning at least the HLR/HSS by providing back the HLR/HSS with the set of managing parameters related to said reactivated SIM card and stored in the database;

modifying at least the routing table of the routing node so that the routing node redirects any message emanating from said SIM card to the HLR/HSS; thus the SIM card is considered as re-activated i.e. in the ACTIVE state.

if, once the de-provisioning of at least the HLR/HSS is completed, no activity of the SIM card is detected, i.e., for instance no attachment request emanating from said SIM card is received, before the end of a quarantine duration that starts at the same time as the observation period and that is longer than the observation period, i.e., the SIM card is considered as inactive (INACTIVE state), then the method comprises de-activating the SIM card through performing the following steps:

removing from the release node at least the association between the unique identifier of the SIM card (IMSI) and the identifier of a subscription (MSISDN) of the SIM card. According to an optional embodiment, at least some of and preferably all the managing parameters of the SIM card are removed from the database of the release node and preferably from all the nodes of the network.

According to an embodiment, the invention provides a method in a cellular communication network comprising at least managing node (for instance a HLR/HSS) that stores managing parameters related to a SIM card associated to a cellular terminal configured to be connected to the network, and at least a routing node configured to route requests between the cellular terminal and the managing node, wherein the method performs the following steps when said SIM card has not been used for at least an observation duration starting from the last activity of the SIM card i.e., the SIM card is considered as dormant (DORMANT state):

de-provisioning at least the managing node by removing from the managing node managing parameters comprising at least a unique identifier of the SIM card (IMSI) and preferably but optionally an identifier of a subscription (MSISDN) associated to the SIM card;

provisioning a release node which comprises backing up in at least a database of said release node said managing parameters. Optionally, this step is performed before the end of the observation period;

modifying at least a routing table of the routing node so that the routing node redirects any attachment request emanating from said SIM card to the release node and not any more to the managing node;

if, once the de-provisioning of at least the managing node is completed, an activity of the SIM card is detected before the end of a quarantine duration that starts at the same time as the observation period and that is longer than the observation period, then the method comprises reactivating the SIM card through performing the following steps:

re-provisioning at least the managing node by providing back the managing node with the set of managing parameters related to said reactivated SIM card and stored in the database;

modifying at least the routing table of the routing node so that the routing node redirects any message emanating from said SIM card to the managing node; thus the SIM card is considered as re-activated i.e. in the ACTIVE state.

if, once the de-provisioning of at least the managing node is completed, no activity of the SIM card is detected, i.e., for instance no attachment request emanating from said SIM card is received, before the end of a quarantine duration that starts at the same time as the observation period and that is longer than the observation period, i.e., the SIM card is considered as inactive (INACTIVE state), then the method comprises de-activating the SIM card through performing the following steps:

removing from the database of the release node and preferably from all the nodes of the network at least some of and preferably all the managing parameters of the SIM card.

Therefore, once the SIM card is considered as dormant, the data associated to the SIM card are removed from the HLR/HSS or from other managing nodes. Thus, the dormant SIM card does not occupy anymore network resources or occupies fewer resources.

In case the subscriber wants to re-activate its SIM card, then the release node receives the attachment/reactivation request from the dormant SIM card tanks to the network routing means (STP for instance or any routing node) that has been modified so as to route the attachment requests from this SIM card toward the release node although the managing nodes (typically the HLR/HSS) is not any more enabled to receive and process the messages from the SIM card.

Then the data stored in the release node are provided back to the relevant managing nodes, allowing thereby the subscriber to access again the network services.

If the subscriber does not re-activate the SIM card before the end of the quarantine duration, then the SIM card is considered as definitively de-activated. The managing parameters previously provisioned in the release node can potentially be removed, freeing thereby the resources of the network.

In addition, the identifier of the subscription associated to the SIM card, typically the MSISDN previously allocated to the subscription, can be re-allocated to another subscriber.

The invention alleviates the need for keeping managing parameters in the managing nodes (typically HLR/HSS) until the end of the quarantine duration. These managing parameters can be removed from the managing nodes (typically HLR/HSS) much earlier i.e., as soon as a SIM card is identified as dormant.

Advantageously, the de-activation process can be completed while the cellular terminal is not attached to the network and while enabling a subsequent reactivation before the end of the quarantine duration. Thus the invention does not need the cellular terminal to be attached to the network in order to allow the de-activation and a further activation.

The managing node is not necessarily a HLR/HSS. The managing node can be taken among any one of the following managing nodes: HLR/HSS, OSS, BSS, AuC, CRM, billing system.

Optionally, the invention may comprise any one of the following features and steps that can be taken separately or in combination:

According to an embodiment, if the SIM card is deactivated, then the method comprises removing from the release node all the managing parameters of the SIM card.

According to an embodiment, if the SIM card is deactivated, then the method comprises allocating the removed identifier of a subscription (MSISDN) to another SIM card.

According to an embodiment, upon de-provisioning the release node, the method comprising recycling the identifier of a subscription (MSISDN) of said SIM card in a phone number pool.

According to an embodiment, detecting an activity of the SIM card comprises receiving at the release node an attachment request emanating from said SIM card.

According to an embodiment, if at least one of the following actions is detected before the end of the observation duration, then considering that the SIM card has been used during the observation duration:

receiving from the SIM card an attachment request for attaching the cellular terminal to the cellular communication network;

receiving/giving a call;

receiving/sending a short message service message (SMS) or a multimedia messaging service message (MMS);

receiving/sending data packets;

receiving/sending an update location message.

According to an embodiment, the step of de-provisioning at least the HLR/HSS comprises removing from the HLR/HSS all the managing parameters related to said SIM card and preferably all parameters and data related to the SIM card.

According to an embodiment, the quarantine duration lasts at least 30 days and wherein the observation duration lasts at least 15 days and no more than the quarantine duration less 10 days. For instance, if the quarantine duration lasts 30 days, the observation duration may last between 15 days, 20 days or less than 20 days. If the quarantine duration lasts 180 days, the observation duration may last 30 days for instance.

According to an embodiment, the identifier of the SIM card is an International Mobile Subscriber Identifier (IMSI) and wherein the identifier of a subscription associated to the SIM card is a Mobile Station Integrated Services Digital Network Number (MSISDN).

According to an embodiment, modifying the routing table of the routing node so that the routing node redirects any message emanating from said SIM card to the release node comprises associating, in the routing tables of the routing node, the IMSI of said inactive SIM card with the address of said release node. According to an embodiment, the step of de-provisioning the HLR/HSS is performed after a successful completion of the step of provisioning the release node.

According to an embodiment, the HLR/HSS detects that the SIM card has not been used for at least an observation duration and then:

sends to the release node an instruction to perform to the step of provisioning the release node;

performs the de-provisioning step.

According to an embodiment, after provisioning the release node and before re-provisioning at least the HLR/HSS, the routing node redirects any transmission sent by the inactive SIM card to the release node.

According to an embodiment, before the observation duration has elapsed without the SIM card being used, at least one managing node of the cellular communication network taken among any one of: an authentication center (AuC), a customer relationship management (CRM), an operation support system (OSS) and a business support system (BSS), stores at least one identifier taken among the identifier of the SIM card (IMSI) and the identifier of a subscription (MSISDN). After the observation duration has elapsed without the SIM card being used: de-provisioning said at least one managing node by removing from said least one managing node said at least one identifier taken among the identifier of the SIM card (IMSI) and the identifier of a subscription (MSISDN). Optionally, de-provisioning said at least one managing node comprises removing from said at least one managing node all the data related to the SIM card.

The routing node of the invention can be any routing node configured to selectively modify the data associated to a SIM card independently of the other SIM cards of the routing table. A routing table stores for each SIM card at least an association of the IMSI of the SIM card and a routing address (for instance the address of the HLR/HSS for this SIM card). The routing node of the invention must be capable of modifying the routing address of this SIM card without modifying the routing address of the other SIM cards.

According to another embodiment, the release node and the routing node are both comprised in a single node. This single node, referred to as the release module has a component in charge of the routing of messages from/toward the SIM card.

According to this embodiment, when the managing node (HLR/HSS for instance) is provisioned with the managing parameters (i.e., when the SIM card is considered as active and not dormant), the routing node of the release module receives all messages from the SIM card and routes them to the managing node.

Upon de-provisioning of the managing node and provisioning of the release node (i.e., when the SIM card is considered as dormant), the routing node of the release module routes the messages from the SIM card to the release node which has been previously provisioned with the managing parameters.

Upon re-provisioning of the managing node (typically the HLR/HSS) (i.e., when the SIM card is re-activated after being dormant), the release module modifies its routing component (routing node of the release module) in order to forward the messages to the managing node to complete the re-activation.

One advantage of this embodiment is that if the conventional routing nodes of the cellular communication network are not able to perform the modification of the routing as requested (in particular the modification of the routing table for a single given SIM card), this additional component included in the release module is able to do that.

Therefore, the invention makes it easier to implement the invention in an existing cellular network wherein the routing nodes are not configured to allow modifying in their routing table the routing parameters for each SIM card individually.

The release module can be composed of a single hardware unit or can be composed of a plurality of hardware units.

According to an embodiment, the invention relates to a computer-program product that contains software program instructions, where execution of the software program instructions by at least one data processor results in performance of operations that comprise execution of at least the following steps:
  identifying that a SIM card has not been used for at least an observation duration, then:
    provisioning a release node which comprises backing up in at least a database stored in at least a data storage device of said release node managing parameters comprising at least a unique identifier of the SIM card (IMSI) and preferably but optionally an identifier of a subscription (MSISDN) associated to the SIM card;
    sending an instruction to modify at least a routing table of a routing node so that the routing node can redirect any attachment request emanating from said SIM card to the release node;
  if an activity of the SIM card is detected before the end of a quarantine duration that starts at the same time as the observation period and that is longer than the observation period, then:
    providing to a managing node the set of managing parameters related to said SIM card;
    sending an instruction to modify at least the routing table of the routing node so that the routing node redirects any message emanating from said SIM card to said managing node.
  if, no activity of the SIM card is detected, i.e., no attachment request emanating from said SIM card is received, before the end of a quarantine duration that starts at the same time as the observation period and that is longer than the observation period:
    removing from the database of the release node at least some of and preferably all the managing parameters of the SIM card.

According to an embodiment, the invention relates to a release node configured to be connected in a cellular communication network comprising at least a managing node that stores managing parameters related to a SIM card associated to a cellular terminal configured to be connected to the network and at least a routing node configured to route requests between the cellular terminal and the managing node, characterized in that the release node is configured to execute the following steps when said SIM card has not been used for at least an observation duration:
  provisioning a database of the release node which comprises backing up in at least a database stored in at least a data storage device of said release node managing parameters comprising at least a unique identifier of the SIM card (IMSI) and preferably an identifier of a subscription (MSISDN) associated to the SIM card;
  optionally sending an instruction to modify at least a routing table of the routing node so that the routing node can redirect any attachment request emanating from said SIM card to the release node;
characterized in that the release node is configured to execute the following steps if an activity of the SIM card is detected before the end of a quarantine duration that starts at the same time as the observation period and that is longer than the observation period:
  providing to a managing node the set of managing parameters related to said SIM card;
  sending an instruction to modify at least the routing table of the routing node so that the routing node redirects any message emanating from said SIM card to said managing node;
and characterized in that the release node is configured to execute the following steps if, no activity of the SIM card is detected, i.e., no attachment request emanating from said SIM card is received, before the end of a quarantine duration that starts at the same time as the observation period and that is longer than the observation period:
  removing from the database of the release node at least some of and preferably all the managing parameters of the SIM card.

According to an embodiment, the invention relates to a system for a cellular communication network comprising:
  at least a managing node that stores managing parameters related to a SIM card associated to a cellular terminal configured to be connected to the network:
  at least a routing node configured to route requests between the cellular terminal and the managing node; and
  at least a release node according to the preceding claim.

According to an embodiment, the invention relates to a method in a cellular communication network comprising the steps of: marking a SIM card as dormant when said SIM card has not been used for at least an observation duration, provisioning a release node by backing up managing parameters related to said dormant SIM card, in a database, de-provisioning relevant managing nodes by removing managing parameters related to said dormant SIM card, redirecting any attachment request emanating from said dormant SIM card to the release node.

It has been noticed that after a first month without being used a SIM card has a 95% probability of not been used again. Then, the invention benefits from this probability to anticipate, at least partially, the memory releasing process.

According to another feature of the invention, said redirecting step further comprises redirecting any transmission intended to said dormant SIM card to the release node.

According to another feature of the invention, said managing parameters comprises: IMSI, MSISDN, Ki.

According to another feature of the invention, said relevant managing nodes comprises: HLR/HSS, VLR, OSS, BSS, IN, AuC, STP.

According to another feature of the invention, said database is located in said release node.

According to another feature of the invention, the redirecting step comprises associating the IMSI of said dormant SIM card with the address of said release node, in routing tables 16'.

According to another feature of the invention, the method further comprises: marking a SIM card as reactivated when receiving a redirected attachment request emanating from said dormant SIM card, and re-provisioning relevant managing nodes by providing back managing parameters related to said reactivated SIM card restored from database.

According to another feature of the invention, said re-provisioning step further comprises redirecting back any message emanating from or directed toward said reactivated SIM card to the previous addresses.

According to another feature of the invention, the method further comprises: deleting any backed up managing parameters related to said reactivated SIM card out of the database.

According to another feature of the invention, the method further comprises: marking a SIM card as inactive when said SIM card has not been used for at least a quarantine duration, releasing the MSISDN of said inactive SIM card.

According to another feature of the invention, the method further comprises: deleting any backed up managing parameters related to said inactive SIM card out of the database.

According to another feature of the invention, said observation duration is shorter that said quarantine duration.

According to an embodiment, the quarantine duration ranges between 30 days and 352 days and preferably between 30 days and 180 days. If the quarantine duration ends and that the SIM card has not been activated, then the SIM card is considered as inactive. Preferably but optionally, the release node is then de-provisioned.

According to an embodiment, the observation period duration starts after a period of inactivity that is equal or longer than 15 days, and preferably equal or longer than 28 days (4 weeks), and preferably equal or longer than 40 days.

The observation duration is shorter that the quarantine duration, both observation and quarantine durations starting at the date of the last activity of the SIM card.

Figure 2:
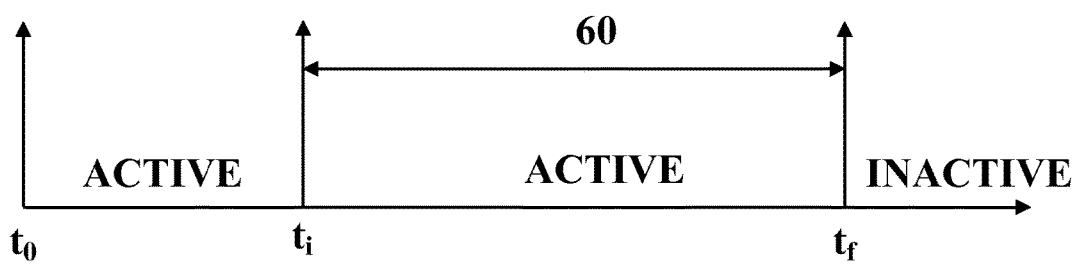
Figure 3:
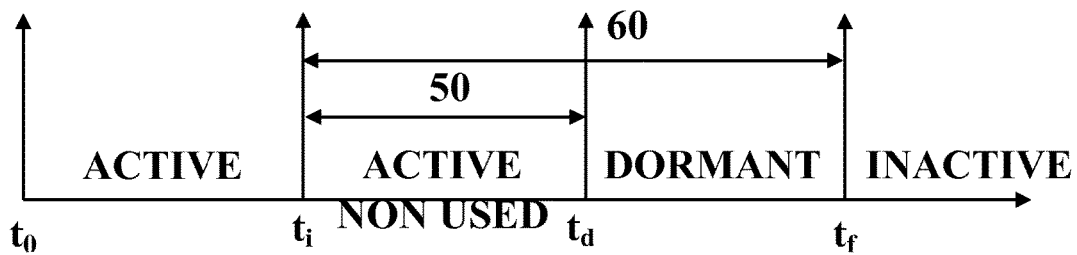
Figure 4:
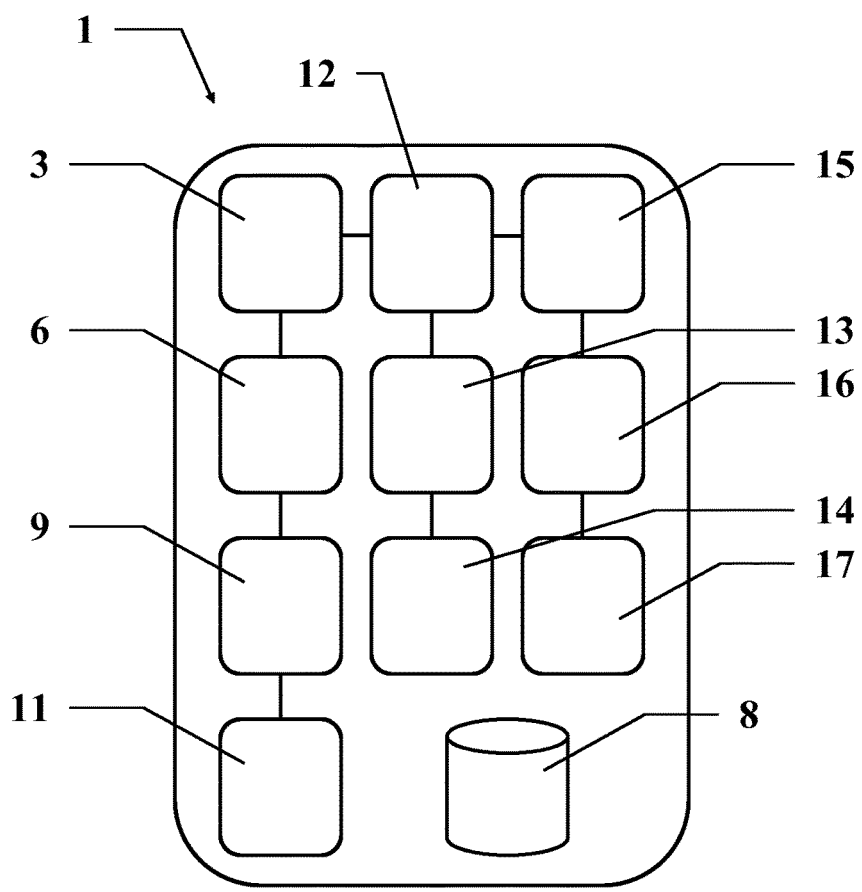
Figure 5:
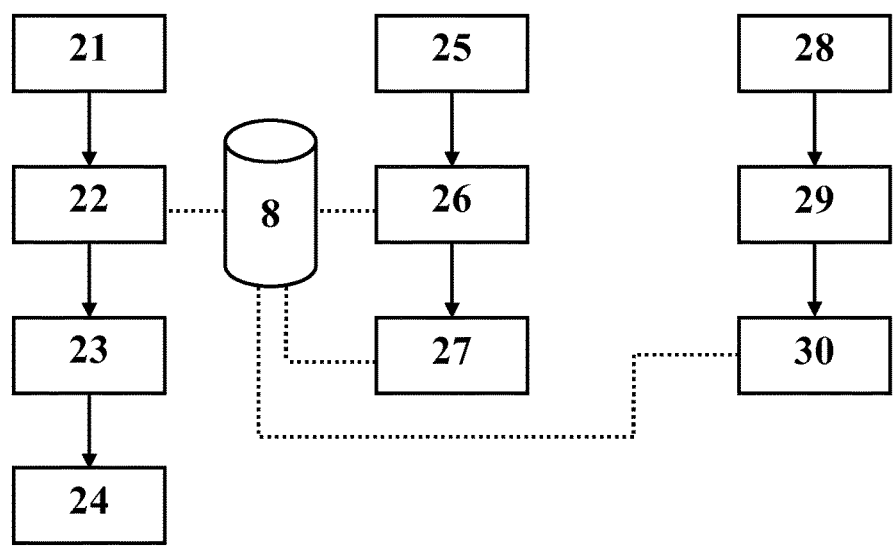

Others features, details and advantages of the invention will become more apparent from the detailed illustrating description given hereafter with respect to the drawings on which:

FIG. 1 shows a schematic view of an embodiment of a typical cellular communication network, FIG. 2 shows a state diagram of a SIM card, according to the prior art, FIG. 3 shows a state diagram of a SIM card, according to the invention, FIG. 4 shows a schematic view of an embodiment of a release node, FIG. 5 shows a diagram of the processes applied by a release node.

In the context of the present invention, the term terminal encompasses all terminals that are configured to communicate in a cellular communication network. The term terminal is equivalent to mobile terminal or cellular terminal or handset or mobile equipment or smartphone. A terminal can for instance be a mobile phone but also a digital pad, a digital tablet, a tablet computer or all equipment configured to communicate over a cellular communication network using a SIM card.

In the context of the present invention, the term SIM card encompasses all the embodiments of integrated circuits that store at least an identifier such as the international mobile subscriber identity (IMSI) and possibly at least a related key used to identify and authenticate subscribers on a cellular communication networks. The SIM card can be inserted in a removable manner in the cellular terminal or can be embedded in the cellular terminal without being removable. The term SIM card usually stands for subscriber identity module or subscriber identification module.

FIG. 1 shows a cellular communication network 2 in relation with a cellular terminal, here figured by its SIM card 4. In the description below, the cellular terminal and the SIM card 4 will be regarded as a single element referred to as the SIM card. Such a cellular communication network 2 comprises a core network, figured here by a cloud, comprising managing nodes 10,18, generally interconnected by wires and also interconnected with at least one base station 17. Said base station 17 comprises radio means to establish a wireless connection with at least one terminal.

When a terminal first establishes an attachment to the cellular communication network 2, it starts an initialization process. During said initialization process, the terminal identifies itself by means of identifiers pertaining to its SIM card 4. During said initialization process, some managing parameters 7 dedicated to said SIM card 4 are used. Said managing parameters 7 are specific to said SIM card 4 and are used by the cellular communication network 2 to handle said SIM card 4 when it uses the services of the cellular communication network 2. In particular, said managing parameters 7 are used to route messages having said SIM card as recipient or sender.

Each SIM card 4 stores an identifier of the SIM card which uniquely identifies the SIM card 4 and which is usually referred to as the International Mobile Subscriber Identifier (IMSI). When the SIM card 4 requests an attachment to the cellular communication network 2, it sends the IMSI to the cellular communication network 2 for identification. The first time the SIM card 4 requests an attachment, during the initialization, the IMSI needs to be defined in an Authentication Centre node, AuC. f the authentication is accepted, the Home Location Register node, HLR/HSS, or the Visitor Location Register node, VLR, manages the SIM card 4 for the normal communication. If the authentication is not accepted, the attachment between the SIM card 4 and the cellular communication network 2 is denied.

During said initialization process, a SIM card 4 is allocated a phone number or Mobile Station Integrated Services Digital Network, MSISDN. Said MSISDN is also part of the managing parameters 7.

Among all the managing nodes 10,18 of the cellular communication network 2, some managing nodes, here called "relevant managing nodes" 10, are more prone to need said managing parameters 7 and keep a record of said managing parameters 7. Relevant managing node 10 can e.g. be the HLR/HSS, a VLR, the AuC, an Operations Support System node, OSS, or a Business Support System node, BSS or a Signal Transfer Point node, STP. Thus at the occasion of a further connection of said SIM card 4 to the cellular communication network 2, any relevant managing node 10 can use its recorded copy of the managing parameters 7 related to said SIM card 4.

Therefore, a relevant managing node 10 stores records containing said managing parameters 7 for a large number of SIM card 4. This occupies a large amount of memory space for each of said relevant managing nodes 10 and also raises the rent on a per SIM card basis. It thus becomes of importance to know, and to know as soon as possible, when a SIM card 4 is no longer used, so as to be able to free the memory space corresponding to the managing parameters 7 of said non used SIM card 4 and consequently decrease the rent.

Either because they must comply to some national regulations or for commercial reasons, cellular communication network operators respect a quarantine duration 60 between the date $t_i$ of the last time a given SIM card 4 has been used and the date $t_f$ of its deactivation. Once the SIM card is considered as deactivated, the operator is allowed to entirely delete from the cellular communication network 2 records all its managing parameters.

In the context of the invention the last use, i.e., the last activity, of a SIM card may correspond to any one of the following events:
  receiving/sending an attachment request for attaching the cellular terminal to the cellular communication network;
  receiving/giving a call;
  receiving/sending a short message service message (SMS) or a multimedia messaging service message (MMS);
  receiving/sending data packets
  receiving/sending an update location message.

This prior art paradigm, currently used, is illustrated in FIG. 2. Since a SIM card 4 has gone through the initialization process at $t_0$, its state is considered as ACTIVE. Date $t_i$ indicates the date of the last usage of said SIM card 4 and starts a quarantine duration 60. At date $t_f$ said quarantine duration 60 ends, without any further use of said SIM card 4 being observed. The state of said SIM card 4 is then turned to INACTIVE. All the resources used in the cellular communication network 2, dedicated to said SIM card 4, e.g. managing parameters 7 stored by said relevant managing nodes 10, can be deleted or de-provisioned and thus freed so as to be eventually reused. It is like said SIM card 4 no longer exists in the cellular communication network 2. Said quarantine duration 60 most often counts in months, typically six months.

To de-provision relevant managing nodes 10 earlier so as to release resources and decrease rent, the invention proposes a new paradigm, illustrated in FIG. 3. According to said new paradigm, a new intermediate DORMANT state is introduced between the fully ACTIVE state and the totally INACTIVE state. As previously, since a SIM card 4 has gone through the initialization process at $t_0$, its state is considered as ACTIVE. Date $t_i$ indicates the date of the last usage of said SIM card 4 and starts both a quarantine duration 60 and an observation duration 50, shorter, and advantageously far shorter, than said quarantine duration 60, e.g. equal to 3 weeks and preferably equal to 4 weeks. At date $t_d$ said observation duration 50 ends, without any further use of said SIM card 4 being observed. The state of said SIM card 4 is then turned to DORMANT. At least some of the resources used in the cellular communication network 2, dedicated to said SIM card 4, e.g. managing parameters 7 stored by said relevant managing nodes 10, can be deleted or de-provisioned and thus freed. This is done at date $t_d$, sooner, and advantageously far sooner, than date $t_f$ at the end of quarantine duration 60.

Typically, the managing parameters 7 de-provisioned from the managing nodes 10, 18 comprise the IMSI. For instance, the following managing parameters are de-provisioned from the:
  HLR/HSS: IMSI, MSISDN. In addition, the following managing parameters may optionally be de-provisioned from the HLR/HSS: ICCID (Integrated Circuit Card Identifier), profile for this IMSI.
  AuC: IMSI, Ki.
  BSS: IMSI, ICCID, MSISDN. In addition, the following managing parameters may optionally be de-provisioned from the BSS: profile associated for the user, such as the account.
  OSS: IMSI, ICCID, MSISDN. In addition, the following managing parameters may optionally be de-provisioned from the OSS: profile associated for the user, such as the account.
  CRM: MSISDN. In addition, the following managing parameters may optionally be de-provisioned from the CRM: user information such as name, address, PUKs.
  OTA server: IMSI, OTA keys.

DORMANT state differs from INACTIVE state. Until quarantine duration 60 has not ended, that is between $t_d$ and $t_f$, the cellular communication network operator must keep record of said SIM card 4. It must be able to reactivate said SIM card 4. Some limited, but strongly reduced when compared to ACTIVE state, resources are only kept in a dedicated release node 1, for that purpose.

One example of such a resource the cellular communication network operator must keep is the phone number, MSISDN, associated to said dormant SIM card 4.

At date $t_f$ the quarantine duration 60 lasts. If no usage from said SIM card 4 has been observed, as previously, the state of said SIM card 4 can be turned to INACTIVE. All remaining resources dedicated to said SIM card 4, ever kept, typically for reactivation purpose, can be deleted and thus freed. It is like said SIM card 4 no longer exists in the cellular communication network 2.

The advantage of said new paradigm appears clearly. The critical period is when a SIM card 4 is ACTIVE and thus provisioned in relevant managing nodes 10, but non used. Said critical period starts at $t_i$. According to the prior art it longs until $t_f$ at the end of the quarantine duration 60. According to the invention it longs until $t_d$, at the end of the observation duration 50.

Such a paradigm is realized through the use of a new managing node, hereafter called a release node 1. Advantageously, said release node 1 can be located, contrary to relevant managing nodes 10, in a part of the cellular communication network 2 not incurring rent on a per SIM card basis.

Such a release node 1, illustrated in FIG. 4 comprises means able to implement at least three processes: a release process, a reactivation process and a deletion process, respectively illustrated in FIG. 5, left column, central column and right column. The release process turns a SIM card 4 into a DORMANT state, de-provisions the managing parameters 7 from the relevant managing nodes 10 and prepares a possible reactivation. The reactivation process turns back a dormant SIM card 4 into an ACTIVE state. The deletion process turns a dormant SIM card 4 into an INACTIVE state. A release node 1 is in charge of managing SIM card 4 when they become and while they are in a DORMANT state.

The release process, illustrated in FIG. 5, left column, starts with a dormant marking step 21, when it is determined that a SIM card 4 has not been used for an observation duration 50 or more.

The trigger used to consider a SIM card 4 has not been used may be selected by the cellular communication network operator. It may be based on outgoing voice calls, data transfer, short messages sent or received, handset turned off, etc or any other equivalent measure, or any combination of the preceding.

Said determination may be made by the release node 1 itself or it can be made by another managing node 10,18 and signalled to the release node 1. In this second case, the dormant marking means 3 only receives said determination signalling. Said determination can typically be made using a history of the operations implying said SIM card 4, by comparing the date of the last operation and the current date to said observation duration 50. Following said determination, the dormant marking means 3, during a dormant marking step 21, marks said cellular terminal subscription 4 as DORMANT, to indicate its state became DORMANT for further proceeding.

Said marking step 21 is only optional. The further steps can be initiated, without any marking step and upon reception of an instruction from a managing node or from the determination by the release node 1 itself that the SIM card 4 has been not active for a period of time that exceeds the quarantine duration 50. Said marking step is only computational and intended to indicate to others processes that the state of said SIM card 4 has changed in order to trigger specific processing. Said marking shall not be construed as physically or even electronically marking said SIM card 4. A possible implementation is a numerical record associating both the IMSI of said SIM card 4 and a DORMANT state indicator.

In fact the marking element 3 does not even need the SIM card 4 to be present in the cellular communication network 2, e.g. by being embedded into a powered on terminal, to proceed. This is advantageous in that the inactivation process may be applied even when a SIM card 4 is not attached to the cellular communication network 2 while allowing a subsequent re-activation process.

Next a provisioning step 22 is applied by a provisioning means 6. During said provisioning step 22, managing parameters 7 related to said dormant SIM card 4, are saved in a database 8. Said managing parameters 7 may be transmitted to the release node 1 from at least one of the relevant managing nodes 10 currently storing them.

Next a release or de-provisioning step 23 can be applied. Since the managing parameters 7 related to said dormant SIM card 4 are now backed up in said database 8, relevant managing nodes 10 can be de-provisioned by removing said managing parameters 7 from their memory. This can be done, e.g. by a release or de-provisioning means 9.

A node, which may be said release node 1, advertises said relevant managing nodes 10, all along the cellular communication network 2, and informs them that they can consider said now dormant SIM card 4 as no longer being present in the cellular communication network 2. Accordingly, said relevant managing nodes 10 don't need to carry on storing said managing parameters 7 related to said dormant SIM card 4. Consequently said relevant managing nodes 10 will probably delete said managing parameters 7 from their memory.

With reference to FIG. 3, since said de-provisioning step 23 occurs at $t_d$, the benefit of the invention appears clearly, with respect to the prior art where the de-provisioning step only occurs at $t_i$. With a typical quarantine duration 60 of six months and an e.g. observation duration 50 of one month, the benefit is a five months decrease of the resources occupation and of the rent. Moreover, experience shows that after a first month of not been used a SIM card 4 has a 95% probability of not been used again. Consequently a reactivation is very rare and the benefit of the invention is final 95% of the time.

Since the DORMANT state is not an INACTIVE state, and said dormant SIM card 4 must be kept track of in order to be able to be reactivated, another step has to be applied. A redirection means 11 can apply a redirecting step 24. Said redirecting step 24 is intended to provide a way to treat an incoming attachment request emanating from said dormant SIM card 4. Since the managing node 10 formerly in charge of said task is no longer provisioned it cannot apply the treatment. According to the invention, said incoming attachment request is redirected to the release node 1, and said release node 1 is able to handle said attachment request.

This redirection step 24 is necessary to be able to reactivate said dormant SIM card 4. An attachment request is the necessary way for a dormant SIM card 4 to indicate it needs a service of the cellular communication network 2 and thus the necessity of its reactivation.

When a SIM card 4 is turned into a DORMANT state, the relevant managing nodes 10 are no longer provisioned and cannot respond to any operation related to said SIM card 4. The redirection of any attachment request emanating from said dormant SIM card 4 is necessary to be able to reactivate said SIM card. In the other direction, that is, in case of any message directed toward said SIM card 4, a similar redirection can also optionally be applied. According to said feature, any message toward said dormant SIM card 4, is redirected toward the release node 1. Accordingly, said release node 1 is able to treat such a message. For instance, a voice call or a text message directed to said dormant SIM card 4 may be treated by a voice or text machine, in order to be able to send it back to the SIM card 4 after and in the case of a reactivation. Said treatments are very similar to those applied to an active SIM card when it is disconnected from the cellular network 2, except that said treatments are here applied by said release node 1, acting as a replacement managing node 10 for dormant SIM cards 4.

Managing parameters 7 as globally mentioned comprise for each SIM card 4 at least the IMSI of the SIM card 4, the MSISDN allocated to said SIM card 4 when it is ACTIVE or DORMANT, and the encryption key Ki, allocated to said SIM card 4 after it has been initialized.

Relevant managing nodes 10 as globally mentioned comprise any managing node 10,18 using any one of said managing parameter 7. They comprise at least HLR/HSS, VLR, OSS, BSS, AuC and STP.

The database 8 used to backup managing parameter 7 when a SIM card 4 is dormant, can be anywhere. However it is advantageously located in said release node 1 or at least in an area managed by said release node 1.

In a cellular communication network 2, any signalling message is routed according to routing tables 16' comprising addresses of the recipient. Said routing tables 16' are contained and managed by routing nodes 16' such as STP nodes for example. A SIM card 4, identified by its IMSI, is thus associated to a "toward" address for the messages toward the SIM card 4 and to a "from" address for the messages incoming from said SIM card 4. In nominal functioning, said "toward" address may be a physical address, e.g. the address of the base station 17 said SIM card 4 is attached through or the address of a voice box when the SIM card 4 is not attached. In nominal functioning, said "from" address may be the physical address of a managing node 10 in charge of the SIM card 4, typically the HLR/HSS. So, a routing table associates the IMSI of said SIM card 4 with its "toward" and "from" addresses. Said routing tables 16' are dynamically updated, e.g. to follow a SIM card 4 during roaming.

According to a feature of the invention, the redirecting step 24 applied when a SIM card 4 is turned in a DORMANT state, can be implemented by updating said routing tables 16' in the routing nodes 16'. In said routing tables 16' the IMSI of said dormant SIM card 4 is associated with the address of the release node 1, for both the "toward" and "from" addresses. By doing so, a message, such as an attachment request, emanating from said SIM card 4 ("from" case) is redirected to the release node 1 acting to reactivate said SIM card 4. Similarly a message directed to the dormant SIM card 4 is also redirected to the release node 1 acting as a voice machine.

Thus, in the method of the invention, once the release node 1 is provisioned, the routing nodes 16 are modified so that in their routing tables 16' the SIM card 4 is from now on associated to the address of the release node instead of being associated to the conventional managing node such as the HLR/HSS. In addition, any message sent to the SIM card 4 is now routed to the release node 1. Therefore, the release node 1 can acts as a HLR/AuC or HSS/AuC during the de-activation period of the SIM card 4, through dialoguing with the subscriber as it will be explained below.

Thus, the routing node 16 of the invention is configured to selectively modify in its routing table 16' the data related to one single SIM card only.

It should be noted that the step of modifying the routing nodes 16 (STP for instance) is not mandatorily triggered by the release node 1. According to another embodiment, a managing node such as the HLR/HSS, sends to the routing nodes 16 an instruction to update their routing tables 16'.

According to an embodiment, in case of a message is directed toward said SIM card 4 while the SIM card 4 has been de-activated, a redirection can also be applied. According to said feature, any message sent toward said inactive SIM card 4 is redirected toward the release node 1. Accordingly, said release node 1 is able to process such messages. For instance, a voice call or a text message directed to said inactive SIM card 4 may be processed by a voice or text machine, in order to be able to send it back to the SIM card 4 after a successful reactivation. Then, if the SIM card 4 is reactivated, the user can find the messages that were sent to him while its SIM card 4 was de-activated. Said processes are very similar to those applied to an active SIM card when it is not attached to the cellular network 2, except that said processing are here applied by said release node 1 acting as a replacement managing node 10 for inactive SIM cards 4 and while the is de-activated. FIG. 4 depicts a module 11 in charge of redirecting messages sent to the de-activated SIM. It appears clearly that this module is optional.

The reactivation process, illustrated in FIG. 5, central column, starts with a reactivation marking step 25. Said reactivation marking step 25 may be applied e.g. by a reactivation marking means 12 and is initiated when an attachment request emanating from a dormant SIM card 4 is received. Since said attachment request is redirected following the previously described redirection step 24, the release node 1 is the receiver. Upon receiving said redirected attachment request the reactivation marking means 12 marks said SIM card 4 as reactivated. As previously noted, said marking is only computational and optional. Said reactivated state indicates that the SIM card 4 intends to attach to the cellular communication network 2 and thus must be replaced in an ACTIVE state again. This also indicates that both the observation duration 50 and the quarantine duration 60 are reset and must be restarted again.

The reactivation process goes on with a re-provisioning step 26 of the relevant managing nodes 10, applied e.g. by a re-provisioning means 13. During said re-provisioning step 26, the managing parameters 7 related to said reactivated SIM card 4 are restored, that is, they are retrieved from database 8 where they have been previously backed up and provided back to the relevant managing nodes 10. After said re-provisioning step 26, the relevant managing nodes 10 are, with respect to said SIM card 4, as they were initially, before the SIM card 4 was turned into a DORMANT state.

Said re-provisioning step further comprises reversing the redirecting step 24 applied during the release process, by applying a redirecting back step. Said redirection back is such that any message, attachment requests included, emanating from said reactivated SIM card 4 is no longer redirected to the release node 1, but is redirected to the managing node 10 in charge of said SIM card 4. Said redirection back is such that any message directed to said SIM card 4 is no longer redirected to the release node 1, but is redirected to the SIM card 4 or any intermediary node.

This is typically done by configuring back the routing nodes 16', by reverting back their routing tables 16' to their previous state, with the previous addresses they contained, before the SIM card 4 was turned dormant. One implementation could be, to have said routing tables 16', for the part related to said SIM card 4, included in said managing parameters 7, and thus backed up in the database 8, during the release process, and restored/re-provisioned back to the routing nodes 16' during the reactivation process.

Another way to consider the reactivation process is to consider a new initialization is applied to the SIM card 4. The reception of an attachment request emanating from a dormant SIM card 4 is followed by a treatment applied by the release node 1, which can greatly compare to an initialization as if it was the first time said SIM card 4 connects to the cellular communication network 2.

Typically, the managing parameters 7 re-provisioned in the managing nodes 10, 18 comprise the IMSI. For instance, the following managing parameters are re-provisioned in the:

HLR/HSS: IMSI, MSISDN. In addition, the following managing parameters may optionally be de-provisioned from the HLR/HSS: ICCID (Integrated Circuit Card Identifier), profile for this IMSI.

AuC: IMSI, Ki.

BSS: IMSI, ICCID, MSISDN. In addition, the following managing parameters may optionally be de-provisioned from the BSS: profile associated for the user, such as the account.

OSS: IMSI, ICCID, MSISDN. In addition, the following managing parameters may optionally be de-provisioned from the OSS: profile associated for the user, such as the account.

CRM: MSISDN. In addition, the following managing parameters may optionally be de-provisioned from the CRM: user information such as name, address, PUKs.

OTA server: IMSI, OTA keys.

Since said SIM card 4 is now in an ACTIVE state again, it is no longer in a DORMANT state, its managing parameters 7 are available again to the relevant managing nodes 10 that may need them to manage a service for said SIM card 4, and the release node 1 no longer needs to keep a copy of said managing parameters 7. Then during a deletion step 27, that may be applied e.g. by a deletion means 14, any backed up managing parameters 7 corresponding to said reactivated SIM card 4 can now be deleted out of the database 8. The SIM card 4 has now returned to the ACTIVE state, is managed by the relevant managing nodes 10 and is no longer known to the release node 1.

Alternately to the reactivation process, a deletion process may occur. The deletion process, illustrated in FIG. 5, right column, starts with an inactive marking step 28. Said inactive marking step 28 may be applied e.g. by an inactive marking means 15 and is initiated when it is determined that a SIM card 4 has not been used for a quarantine duration 60 or more. Said determination can be made by the release node 1 itself, since it is in charge of managing dormant SIM cards 4. However it can also be made by another managing node 10,18 and signalled to the release node 1. In this second case, the inactive marking means 15 only receives said signalling. Said determination can typically be made using a history of the operations implying said SIM card 4, by comparing the date of the last operation and the current date to said quarantine duration 60. Following said determination, the inactive marking means 15, during an inactive marking step 28, marks said SIM card 4 as INACTIVE, to indicate its state became INACTIVE for further proceeding. Here again the marking is computational and is only optional.

Since said SIM card 4 is now in an INACTIVE state, its MSISDN is no longer reserved. Said MSISDN of said now inactive SIM card 4 can be released. This MSISDN releasing step 29 can e.g. be applied by a MSISDN release means 16.

Since said SIM card 4 is now in an INACTIVE state, it is no longer in a DORMANT state, and the release node 1 no longer needs to keep a copy of said managing parameters 7, which are now useless. Then during a deletion step 30, that may be applied e.g. by a deletion means 17, any backed up managing parameters 7 corresponding to said now inactive SIM card 4 can now be deleted out of the database 8. The SIM card 4 is now in the INACTIVE state, is no longer managed or known by any node in the cellular communication network 2.

Here also the trigger used to consider a SIM card 4 has not been used may be selected by the cellular communication network operator. It may be based on the lack of attachment request received. Either it may be based on outgoing voice calls, data transfer, short messages sent or received, terminal turned off, etc. or any other equivalent measure, or any combination of the preceding.

According to another embodiment, the release node 1 and the routing node 16 are both comprised in a single node. This single node, referred to as the release module thus has a routing component in charge of the routing of messages from/toward the SIM card. Therefore, according to this embodiment, the routing node having a capability to modify the routing is run inside the release module.

When the managing node (HLR/HSS for instance) is provisioned with the managing parameters (i.e, when the SIM card is considered as active and not yet dormant), the routing node 16 of the release module receives all messages from the SIM card 4. The routing node of the release module can then route the messages to the managing node 10. Thus, the normal routing sends all messages (authentication and update location for instance) to the release module.

Upon de-provisioning of the managing node and provisioning of the release node (i.e., when the SIM card is considered as dormant), the routing node 16 of the release module routes the messages from the SIM card 4 to the release node 1 which has been previously provisioned with the managing parameters.

Upon re-provisioning of the managing node (typically the HLR/HSS) (i.e., when the SIM card is re-activated), the release module modifies its routing component (routing node 16 of the release module) in order to forward the messages to the managing node 10 to complete the re-activation.

One advantage of this embodiment is that if the conventional routing nodes of the cellular communication network are not able to perform the modification of the routing as requested, in particular the modification of a routing table for a single given SIM card, this additional component included in the release module is able to do it.

Thus with this embodiment, it is easier to implement the invention in an existing cellular network wherein the routing nodes are not configured to allow modifying, in their routing table, the routing parameters for each SIM card individually.

The release module can be composed of a single hardware unit or can be composed of a plurality of hardware units.

From the present description, it appears that the invention allows releasing network resources by de-provisioning relevant managing nodes as soon as a SIM card is identified as dormant i.e. at the end of the observation duration, i.e. much before the end of the quarantine duration. In case the subscriber, owner of said dormant SIM card, re-activates it after it has been turned dormant and its managing parameters de-provisioned, then the release node, which has stored the managing parameters in a database, can re-provision the relevant managing nodes, allowing thereby the subscriber to access again the network services.

While there is shown and described the present preferred embodiment of the invention, it is to be distinctly understood that this invention is not limited thereto but may be variously embodied to practice within the scope of the following claims.

Although the various elements of the release node have been depicted on FIG. 4 as pertaining to the same node, the description shall not be construed as describing a physical node performing all the processes described in relation to FIG. 4. Indeed, the invention encompasses all embodiments where various and possibly independent modules are in charge of performing the processes of FIG. 4.

The invention claimed is:

1. A method in a cellular communication network comprising at least a home location register/home subscriber server (HLR/HSS) that stores managing parameters related to a SIM card associated to a cellular terminal configured to be connected to the network said managing parameters comprising at least an International Mobile Subscriber Identifier (IMSI), and at least a routing node configured to route requests between the cellular terminal and the HLR/HSS, provisioning a release node which comprises backing up in at least a database of said release node said managing parameters;

wherein the method performs the following steps if said SIM card that stores said IMSI has not been used before the end of an observation duration starting from the last activity of the SIM card:

de-provisioning at least the HLR/HSS by removing from the HLR/HSS an identifier of a subscription (MSISDN) associated to the SIM card;

directing toward the release node any attachment request emanating from said SIM card, wherein directing toward the release node comprises modifying at least a routing table of the routing node so that the routing node redirects any attachment request emanating from said SIM card to the release node, wherein modifying the routing table of the routing node so that the routing node redirects any message emanating from said SIM card to the release node comprises associating, in the routing tables of the routing node, the IMSI of said inactive SIM card with the address of said release node;

if, once the de-provisioning of at least the HLR/HSS is completed, an activity of the SIM card is detected before the end of a quarantine duration that starts at the same time as the observation period and that is longer than the observation period, then the method comprises reactivating the SIM card through performing the following steps:
re-provisioning at least the HLR/HSS by providing back the HLR/HSS with at least said identifier of a subscription (MSISDN) associated to the SIM card and stored in the database; and
directing toward the HLR/HSS any message emanating from said SIM card;

if, once the de-provisioning of at least the HLR/HSS is completed, no activity of the SIM card is detected before the end of a quarantine duration that starts at the same time as the observation period and that is longer than the observation period, then the method comprises de-activating the SIM card through performing the following steps:
removing from the database of the release node the managing parameters of the SIM card;
recycling the identifier of a subscription (MSISDN) of said SIM card in a phone number pool; and
allocating the removed identifier of a subscription (MSISDN) to another SIM card; and wherein the quarantine duration lasts at least 30 days and wherein the observation duration lasts at least 15 days and no more than the quarantine duration less 10 days.

2. Method according to claim 1 wherein directing toward the HLR/HSS any message emanating from said SIM card comprises modifying at least the routing table of the routing node so that the routing node redirects any message emanating from said SIM card to the HLR/HSS.

3. Method according to claim 1 wherein if the SIM card is deactivated, then the method comprises removing from the release node all the managing parameters of the SIM card.

4. Method according to claim 1 wherein detecting an activity of the SIM card comprises receiving at the release node an attachment request emanating from said SIM card.

5. Method according to claim 1 wherein if at least one of the following actions is detected before the end of the observation duration, then considering that the SIM card has been used during the observation duration:
receiving from the SIM card an attachment request for attaching the cellular terminal to the cellular communication network;
receiving / giving a call;
receiving/sending a short message service message (SMS) or a multimedia messaging service message (MMS);
receiving/sending data packets; and
receiving/sending an update location message.

6. Method according to claim 1 wherein the step of de-provisioning at least the HLR/HSS comprises removing from the HLR/HSS all the managing parameters related to said SIM card.

7. Method according to claim 1 wherein the identifier of the SIM card is an International Mobile Subscriber Identifier (IMSI) and wherein the identifier of a subscription associated to the SIM card is a Mobile Station Integrated Services Digital Network Number (MSISDN).

8. Method according to claim 1 wherein the step of de-provisioning the HLR/HSS is performed after a successful completion of the step of provisioning the release node.

9. Method according to claim 1 wherein the HLR/HSS detects that the SIM card has not been used for at least an observation duration and then:
sends to the release node an instruction to perform the step of provisioning the release node;
performs the de-provisioning step.

10. Method according to claim 1 wherein after provisioning the release node and before re-provisioning at least the HLR/HSS, the routing node redirects any transmission sent by the inactive SIM card to the release node.

11. Method according to claim 1 wherein before the observation duration has elapsed without the SIM card being used, at least one managing node of the cellular communication network taken among any one of: an authentication center (AuC), a customer relationship management (CRM), an operation support system (OSS) and a business support system (BSS), stores at least one identifier taken among the identifier of the SIM card (IMSI) and the identifier of a subscription (MSISDN);
wherein after the observation duration has elapsed without the SIM card being used: de-provisioning said at least one managing node by removing from said least one managing node said at least one identifier taken among the identifier of the SIM card (IMSI) and the identifier of a subscription (MSISDN)
and wherein de-provisioning said at least one managing node comprises removing from said at least one managing node all the data related to the SIM card.

12. Method according to claim 1 wherein after said SIM card has not been used for at least a quarantine duration the release node is provisionised with the new identifier of a subscription (New MSISDN).

13. A computer program product stored on a non-transitory computer readable medium that contains software program instructions, where execution of the software program instructions by at least one data processor results in performance of operations that comprise execution of at least the following steps:
identifying that a SIM card has not been used for at least an observation duration, said SIM card storing at least an International Mobile Subscriber Identifier (IMSI) then:
provisioning a release node which comprises backing up in at least a database stored in at least a data storage device of said release node managing parameters comprising at least said IMSI and an identifier of a subscription (MSISDN) associated to the SIM card;
sending an instruction to modify at least a routing table of a routing node so that the routing node can redirect any attachment request emanating from said SIM card to the release node which comprises sending an instruction to associate, in the routing tables of the routing node, said IMSI of said inactive SIM card with the address of said release node;

if an activity of the SIM card is detected before the end of a quarantine duration that starts at the same time as the observation period and that is longer than the observation period, then:
  providing to a managing node the set of managing parameters related to said SIM card;
  sending an instruction to modify at least the routing table of the routing node so that the routing node redirects any message emanating from said SIM card to said managing node;
  if, no activity of the SIM card is detected, before the end of a quarantine duration that starts at the same time as the observation period and that is longer than the observation period:
    removing from the database of the release node the managing parameters of the SIM card; and
  wherein the quarantine duration lasts at least 30 days and wherein the observation duration lasts at least 15 days and no more than the quarantine duration less 10 days.

14. System for a cellular communication network comprising: at least a managing node that stores managing parameters related to a SIM card associated to a cellular terminal configured to be connected to the network: at least a routing node configured to route requests between the cellular terminal and the managing node; and at least a release node according to claim 13.

15. A method in a cellular communication network comprising at least a home location register/home subscriber server (HLR/HSS) that stores managing parameters related to a SIM card associated to a cellular terminal configured to be connected to the network said managing parameters comprising at least an International Mobile Subscriber Identifier (IMSI), and at least a routing node configured to route requests between the cellular terminal and the HLR/HSS,
  provisioning a release node which comprises backing up in at least a database of said release node said managing parameters;
  wherein the method performs the following steps if said SIM card that stores said IMSI has not been used before the end of an observation duration starting from the last activity of the SIM card:
    de-provisioning at least the HLR/HSS by removing from the HLR/HSS an identifier of a subscription (MSISDN) associated to the SIM card;
    directing toward the release node any attachment request emanating from said SIM card, wherein directing toward the release node comprises associating, in the routing tables of the routing node, the IMSI of said inactive SIM card with an address of said release node and with an address of the HLR/HSS;
    if, once the de-provisioning of at least the HLR/HSS is completed, an activity of the SIM card is detected before the end of a quarantine duration that starts at the same time as the observation period and that is longer than the observation period, then the method comprises reactivating the SIM card through performing the following steps:
      re-provisioning at least the HLR/HSS by providing back the HLR/HSS with at least said identifier of a subscription (MSISDN) associated to the SIM card and stored in the database; and
      directing toward the HLR/HSS any message emanating from said SIM card;
    if, once the de-provisioning of at least the HLR/HSS is completed, no activity of the SIM card is detected before the end of a quarantine duration that starts at the same time as the observation period and that is longer than the observation period, then the method comprises de-activating the SIM card through performing the following steps:
      removing from the database of the release node the managing parameters of the SIM card;
      recycling the identifier of a subscription (MSISDN) of said SIM card in a phone number pool; and
      allocating the removed identifier of a subscription (MSISDN) to another SIM card; and
    wherein the quarantine duration lasts at least 30 days and wherein the observation duration lasts at least 15 days and no more than the quarantine duration less 10 days.

16. Method according to claim 15, wherein the routing node duplicates any attachment request emanating from said SIM card and sends it to both the release node and the HLR/HS S.

17. Method according to claim 15, wherein the step of de-provisioning at least the HLR/HSS comprises keeping in the HLR/HSS said IMSI related to said SIM card.

18. Method according to claim 15, wherein the step of de-provisioning the HLR/HSS is performed after a successful completion of the step of provisioning the release node.

19. Method according to claim 15, wherein the HLR/HSS detects that the SIM card has not been used for at least an observation duration and then:
  sends to the release node an instruction to perform the step of provisioning the release node; and
  performs the de-provisioning step.

20. Method according to claim 15, wherein after provisioning the release node and before re-provisioning at least the HLR/HSS, the routing node redirects any transmission sent by the inactive SIM card to the release node.

21. Method according to claim 15, wherein before the observation duration has elapsed without the SIM card being used, at least on managing node of the cellular communication network taken among any one of: an authentication center (AuC), a customer relationship management (CRM), an operation support system (OSS) and a business support system (B S S), stores at least one identifier taken among the identifier of the SIM card (IMSI) and the identifier of a subscription (MSISDN),
  wherein after the observation duration has elapsed without the SIM card being used de-provisioning said at least one managing node by removing from said at least one managing node said at least one identifier taken among the identifier of the SIM card (IMSI) and the identifier of a subscription (MSISDN) and wherein de-provisioning said at least one managing node comprises removing from said at least one managing node all the data related to the SIM card.

22. Method according to claim 15, wherein after said SIM card has not been used for at least a quarantine duration the release node is provisioned with the new identifier of a subscription (New MSISDN).

* * * * *